US012759216B2

(12) United States Patent
Kojima

(10) Patent No.: US 12,759,216 B2
(45) Date of Patent: Oct. 13, 2026

(54) SEAT CUSHION, AND METHOD FOR MANUFACTURING SAME

(71) Applicant: AIRWEAVE Inc., Nukata-gun (JP)

(72) Inventor: Masakazu Kojima, Aichi (JP)

(73) Assignee: AIRWEAVE INC., Aichi (JP)

( * ) Notice: Subject to any disclaimer, the term of this patent is extended or adjusted under 35 U.S.C. 154(b) by 138 days.

(21) Appl. No.: 18/844,262

(22) PCT Filed: Mar. 23, 2023

(86) PCT No.: PCT/JP2023/011522

§ 371 (c)(1),
(2) Date: Sep. 5, 2024

(87) PCT Pub. No.: WO2023/210220

PCT Pub. Date: Nov. 2, 2023

(65) Prior Publication Data

US 2025/0178269 A1 Jun. 5, 2025

(30) Foreign Application Priority Data

Apr. 25, 2022 (JP) ................................ 2022-071935

(51) Int. Cl.
*B29C 55/30* (2006.01)
*A47C 27/12* (2006.01)
(Continued)

(52) U.S. Cl.
CPC .............. *B29C 55/30* (2013.01); *A47C 27/12* (2013.01); *B29D 99/0092* (2013.01); *B29L 2031/58* (2013.01)

(58) Field of Classification Search
CPC ..... B29C 55/30; A47C 27/12; B29D 99/0092; B29L 2031/58
(Continued)

(56) References Cited

U.S. PATENT DOCUMENTS 3,353,869 A * 11/1967 Getz ...................... A47C 5/125
297/452.49
2013/0020016 A1 1/2013 Takaoka
(Continued)

FOREIGN PATENT DOCUMENTS

JP S58-183151 U 12/1983
JP S61-137732 A 6/1986
(Continued)

OTHER PUBLICATIONS

International Search Report for International Application No. PCT/JP2023/011522 dated May 30, 2023.

*Primary Examiner* — Jose V Chen
(74) *Attorney, Agent, or Firm* — Harness, Dickey & Pierce, P.L.C.

(57) ABSTRACT

A method for producing a seat cushion includes a molten filament supplying step of discharging a plurality of molten filaments of a thermoplastic resin or the like downward in a thermal vertical direction from a plurality of nozzle holes, a three-dimensional filaments fused body forming step of fusion-bonding contact points between the plurality of molten filaments while three-dimensionally entangling the molten filaments to form a three-dimensional filaments fused body, and a three-dimensional filaments-linked structure forming step of cooling and solidifying the three-dimensional filaments fused body while drawing the three-dimensional filaments fused body with an underwater drawing machine provided in cooling water to thereby form a three-dimensional filaments-linked structure, the three-dimensional filaments-linked structure forming step includes a three-dimensional filaments-linked structure density controlling step of controlling a density of the three-dimensional filaments fused body by varying a drawing speed of the underwater drawing machine.

5 Claims, 8 Drawing Sheets

(51) Int. Cl.
*B29D 99/00* (2010.01)
*B29L 31/58* (2006.01)

(58) Field of Classification Search
USPC ........................................................ 297/452.1
See application file for complete search history.

(56) References Cited

U.S. PATENT DOCUMENTS

| | | | | |
|---|---|---|---|---|
| 2013/0264742 | A1* | 10/2013 | Ota | B60N 2/5657 264/266 |
| 2015/0072107 | A1* | 3/2015 | Fujita | B32B 5/026 442/221 |
| 2015/0158213 | A1* | 6/2015 | Mogi | B29C 33/12 264/46.9 |
| 2016/0157630 | A1* | 6/2016 | DeFranks | D06N 3/005 442/374 |
| 2016/0167260 | A1* | 6/2016 | Thomas | B32B 27/32 428/304.4 |
| 2016/0229126 | A1* | 8/2016 | Every | A47C 7/029 |
| 2017/0129201 | A1* | 5/2017 | Kristo | B60N 2/7017 |
| 2018/0148312 | A1 | 5/2018 | Kojima et al. | |
| 2019/0002272 | A1* | 1/2019 | Kristo | B60N 2/7017 |
| 2020/0047649 | A1* | 2/2020 | Takahashi | A47C 7/029 |
| 2021/0025082 | A1* | 1/2021 | Takechi | D02J 13/001 |
| 2021/0069948 | A1* | 3/2021 | Selvasekar | B29C 44/356 |
| 2021/0221266 | A1* | 7/2021 | Kozlowski | B60N 2/5891 |
| 2022/0053944 | A1 | 2/2022 | Rajaratnam | |

FOREIGN PATENT DOCUMENTS

| | | | | | |
|---|---|---|---|---|---|
| JP | 2003251089 | A | * | 9/2003 | |
| JP | 2006097223 | A | * | 4/2006 | A47C 27/122 |
| JP | 2013215476 | A | * | 10/2013 | |
| JP | 2020172211 | A | * | 10/2020 | B33Y 70/00 |
| JP | 2020-198960 | A | | 12/2020 | |
| WO | 2012/029324 | A1 | | 3/2012 | |
| WO | WO-2014003487 | A1 | * | 1/2014 | B60R 22/12 |
| WO | 2017/12237 | A1 | | 1/2017 | |
| WO | 2018-055891 | A1 | | 3/2018 | |
| WO | WO-2020051625 | A1 | * | 3/2020 | A47C 27/15 |

* cited by examiner

SEAT CUSHION, AND METHOD FOR MANUFACTURING SAME

CROSS-REFERENCE TO RELATED APPLICATIONS

This application is the National Stage of International Application No. PCT/JP2023/011522, filed Mar. 23, 2023, which claims priority to Japanese Patent Application No. 2022-071935, filed on Apr. 25, 2022, the entire contents of each of which are incorporated herein by reference.

TECHNICAL FIELD

The invention relates to a seat cushion for use on a chair, a sofa, a floor cushion, and the like, and a method for producing the same.

BACKGROUND ART

A conventional seat cushion of a uniform material, such as a sponge, is explained first. FIG. 8 shows a state in supporting buttocks of a user by using a conventional seat cushion 500 of a uniform material. When the modulus of elasticity of a central part (buttocks-supporting area) of the seat cushion 500 is uniform, the sinking depth of buttocks is largest at the buttock tops. Since the compression distance of the seat cushion is largest at the buttock tops, a pressure Pc exerted by the seat cushion is highest at the buttock tops.

On the other hand, since the sinking depth of buttocks is smaller in peripheral portions of the buttocks, the compression distance of the seat cushion is smaller in the peripheral portions of the buttocks and a pressure Ps exerted by the seat cushion is lower therein. As a result, a sense of pressure is liable to be given at the buttock tops and at the same time, the support is weaker at the left and right ends of the buttocks of the user, resulting in poor stableness against left/right swinging.

There is a method in which the pressure Pc at the buttock tops is reduced by decreasing the modulus of elasticity of the seat cushion 500. However, a decrease in the modulus of elasticity leads to a risk of bottoming. An increase in the thickness of the seat cushion lowers the risk of bottoming but involves a disadvantage of bulkiness of the seat cushion.

Thus, in order to improve a seat cushion to enhance the sitting comfort and to stabilize the sitting posture, for example, Patent Literature 1 discloses a seat cushion in which a soft cushion is disposed in a central part of a seat surface and a hard cushion is disposed on both the sides to increase the holdability.

On the other hand, a three-dimensional filaments-linked structure in which a plurality of filaments of a thermoplastic resin are three-dimensionally fusion-bonded is superior in air permeability due to its high porosity and is easily washed with water, and thus attracts attention as a cushion material for chairs, bedding, and the like which are required to be clean.

As a method for freely varying the hardness and thickness of a three-dimensional filaments-linked structure that is used as a seat cushion, for example, Patent Literature 2 and Patent Literature 3 disclose methods in which a three-dimensional filaments-linked structure (spring structure resin molded article) is deformed by compressing the three-dimensional filaments-linked structure with a mold.

However, in the methods of compression disclosed in Patent Literature 2 and Patent Literature 3, a three-dimensional filaments-linked structure has to be compressed with a mold, and thus, there is a disadvantage of requiring multiple steps for producing a cushion, leading to a cumbersome production process.

Furthermore, when custom-made seat cushions that are respectively suited to individual users having different body weights and widths of buttocks are to be produced, molds respectively suited to body shapes of the individual users have to be prepared, and thus, there are disadvantages of a more cumbersome production process and an increased period of time from the order to completion of the cushion.

In addition, when the distribution of hardness (distribution of modulus of elasticity) of a seat cushion is to be finely adjusted according to the body weight and body shape of an individual user, there is a disadvantage of difficult production not only of the mold but also of the three-dimensional filaments-linked structure itself before compression with the mold.

On the other hand, as a method for adjusting the filament density of a three-dimensional filaments-linked structure, Patent Literature 4 and Patent Literature 5 disclose a method for producing a mattress for a bed.

CITATION LIST

Patent Literature

Patent Literature 1: JP-A 61-137732 (1986)
Patent Literature 2: JP-A 2003-251089
Patent Literature 3: WO2012/029324
Patent Literature 4: WO2017/122370
Patent Literature 5: WO2018/055891

SUMMARY OF INVENTION

Technical Problem

The invention has an object to provide a method that can efficiently produce, in a short period of time, a seat cushion that has a distribution of modulus of elasticity (distribution of density) suited to a user's body shape, that is superior in air permeability, and that can be easily washed with water.

The invention also has an object to provide a seat cushion in which the pressure exerted on buttocks by the seat cushion in seating is less likely to be concentrated on the buttock tops and user's buttocks are easily stabilized (which is superior in holdability).

Solution to Problem

A first aspect of the method for producing a seat cushion of the invention is a method for producing a seat cushion including a three-dimensional filaments-linked structure of a thermoplastic resin or a thermoplastic elastomer (hereinafter referred to as "thermoplastic resin or the like"), the method including

- a molten filament supplying step of discharging a plurality of molten filaments of a thermoplastic resin or the like downward in a thermal vertical direction from a plurality of nozzle holes,
- a three-dimensional filaments fused body forming step of fusion-bonding contact points between the plurality of molten filaments while three-dimensionally entangling the molten filaments to form a three-dimensional filaments fused body, and
- a three-dimensional filaments-linked structure forming step of cooling and solidifying the three-dimensional filaments fused body while drawing the three-dimensional filaments fused body with an underwater drawing machine provided in cooling water to thereby form a three-dimensional filaments-linked structure, the three-dimensional filaments-linked structure forming step including a three-dimensional filaments-linked structure density controlling step of controlling a density of the three-dimensional filaments fused body by varying a drawing speed of the underwater drawing machine, the drawing speed of the underwater drawing machine being varied, based on a standard upper body weight and a standard width of buttocks of a group of humans who are to use the seat cushion, and a drawing speed of the underwater drawing machine in an area for producing a seat surface left-right direction central part corresponding to the width of buttocks being higher than a drawing speed of the underwater drawing machine in areas for producing both seat surface left-right direction end parts outside the width of buttocks.

Note that the seat surface left-right direction is a left-right direction on the basis of a person who sits on the seat cushion and a perpendicular direction thereof is a front-back direction.

According to this aspect, since the distribution of modulus of elasticity (the distribution of density) can be varied only by adjusting the drawing speed of an underwater drawing machine (a pair of slat conveyers), a seat cushion that is superior in air permeability, that can be easily washed with water, and that has a distribution of modulus of elasticity (distribution of density) in the left-right direction suited to a standard body shape of users can be efficiently produced by controlling the drawing speed of the underwater drawing machine while taking into account a standard width of buttocks of users.

A second aspect of the method for producing a seat cushion of the invention is characterized in that, in the three-dimensional filaments-linked structure density controlling step, a density of the three-dimensional filaments-linked structure in the seat surface left-right direction of the seat cushion is controlled so that a drawing speed of the underwater drawing machine in an area for producing a seat surface left-right direction central part corresponding to the width of buttocks is higher than a drawing speed of the underwater drawing machine in areas for producing both seat surface left-right direction end parts outside the width of buttocks, by continuously or intermittently varying the drawing speed of the underwater drawing machine, based on an upper body weight and a width of buttocks of an individual user.

According to this aspect, since the distribution of modulus of elasticity (distribution of density) can freely be varied only by adjusting the drawing speed of an underwater drawing machine (a pair of slat conveyers) based on individual user's data, a seat cushion that is superior in air permeability, that can be easily washed with water, and that has a distribution of modulus of elasticity (distribution of density) in the left-right direction suited to a body shape of an individual user can be efficiently produced by controlling the drawing speed of the underwater drawing machine while taking into account the width of buttocks of the individual user.

A third aspect of the method for producing a seat cushion of the invention is characterized in that, in the three-dimensional filaments-linked structure density controlling step, a drawing speed of the underwater drawing machine in areas for producing end portions of the seat surface left-right direction central part adjacent to both end parts of the seat cushion corresponding to positions not to be in contact with buttocks is increased or decreased so that the drawing speed of the underwater drawing machine in the area for producing the seat surface left-right direction central part corresponding to the standard width of buttocks or the width of buttocks of the seat cushion is higher than that of other area and the drawing speed of the underwater drawing machine in the areas for producing both the end parts is lower than that of other area.

According to this aspect, since the density in areas of both the left-right direction end parts of the seat cushion which are not to be in contact with buttocks is higher, and the modulus of elasticity of the areas of both the left-right direction end parts of the seat cushion which are not to be in contact with buttocks is higher and the sinking depth is lower. As a result, even when the seating position is shifted to either direction in the left-right direction from an assumed seating position of the seat cushion, a downward slope is formed from both the left-right direction end parts having a higher modulus of elasticity toward the left-right direction central part having a lower modulus of elasticity in the state of sitting on the seat cushion, and thus, the seating position is liable to naturally be moved toward the central part.

A fourth aspect of the method for producing a seat cushion of the invention is characterized in that, in the three-dimensional filaments-linked structure density controlling step, the drawing speed of the underwater drawing machine is controlled so that a drawing speed of the underwater drawing machine in an area corresponding to a position of a standard buttock top portion of the human group or a buttock top portion of an individual user of the seat surface left-right direction central part is highest.

The buttock top portion is now explained. The buttock top of the buttock top portion refers to a vertical direction lowermost portion of an ischium in seating, and since a buttock top is present on each of the left and right ischiums, two buttock tops appear in seating, and the area between the two buttock tops is the buttock top portion.

According to this aspect, in the left-right direction central part of the seat cushion which is to be in contact with the buttock top portion giving the largest sinking depth, a significant increase in a pressure Pc can be prevented, and at the same time, in buttock peripheral portions giving a small sinking depth, a decrease in a pressure Ps can be suppressed. Accordingly, a seat cushion in which the pressure exerted by the seat cushion is less likely to be concentrated on the buttock tops and user's buttocks are easily stabilized (which is superior in holdability) can be obtained.

Furthermore, an aspect of the seat cushion of the invention is a seat cushion including a three-dimensional filaments-linked structure of one material that is a thermoplastic resin or a thermoplastic elastomer, the seat cushion having a flat seat surface and having a density of the three-dimensional filaments-linked structure of a seat surface left-right direction central part corresponding to a standard width of adult buttocks lower than a density thereof in both seat surface left-right direction end parts outside the standard width of adult buttocks.

In the seat cushion of the invention, although the seat cushion is made of one material and has a flat seat surface, since the density of the three-dimensional filaments-linked structure of the seat surface left-right direction central part largely compressed by seating a user is made lower, the pressure that buttocks receive is averaged, leading to comfortability in sitting. In other words, in spite of a visually flat seat cushion, since the seat cushion has, for example, a u-shaped distribution of modulus of elasticity in the left-right direction, the cushion is deformed in a u-shape according to the shape of buttocks in seating (under a certain load).

Advantageous Effects of Invention

According to the method for producing a seat cushion of the invention, an increase in the pressure Pc can be prevented in the buttocks which give a larger sinking depth, and a decrease in the pressure Ps can be suppressed in peripheral portions of the buttocks which give a smaller sinking depth. Accordingly, a seat cushion in which the load of buttocks is less likely to be concentrated and user's buttocks are easily stabilized can be obtained.

In addition, without varying the thickness in the vertical direction, only by adjusting the distribution of modulus of elasticity in the left-right direction, a seat cushion in which user's buttocks are easily stabilized (which is superior in holdability) and which is flat in the left-right direction can be obtained. Accordingly, as compared with a conventional seat cushion provided with a thick cushion on both the sides thereof, a seat cushion on which a move to the left-right direction is easily made can be obtained.

In particular, when individual user's custom-made seat cushions are produced based on data of individual users having different body shapes (upper body weights and widths of buttocks, and further, the buttock top portions), a significant increase in the pressure Pc at the buttock tops where the sinking depth is largest can be prevented, and a seat cushion in which the load of buttocks is less likely to be concentrated on the buttock tops and user's buttocks are easily stabilized can be obtained.

In addition, since the density (i.e., modulus of elasticity) in the left-right direction of the seat cushion in an area supporting individual user's buttocks can be adjusted based on individual user's data, different custom-made seat cushions optimal respectively for individual users can be continuously produced with the same production equipment.

BRIEF DESCRIPTION OF DRAWINGS

Objects, characteristics, and advantages of this disclosure will be apparent from the following detailed description and drawings.

DESCRIPTION OF EMBODIMENTS

A suitable embodiment of the invention will be described in detail below with reference to drawings.

Note that the invention is not limited to the following embodiments and can be appropriately modified within the scope of the invention.

Figure 1:
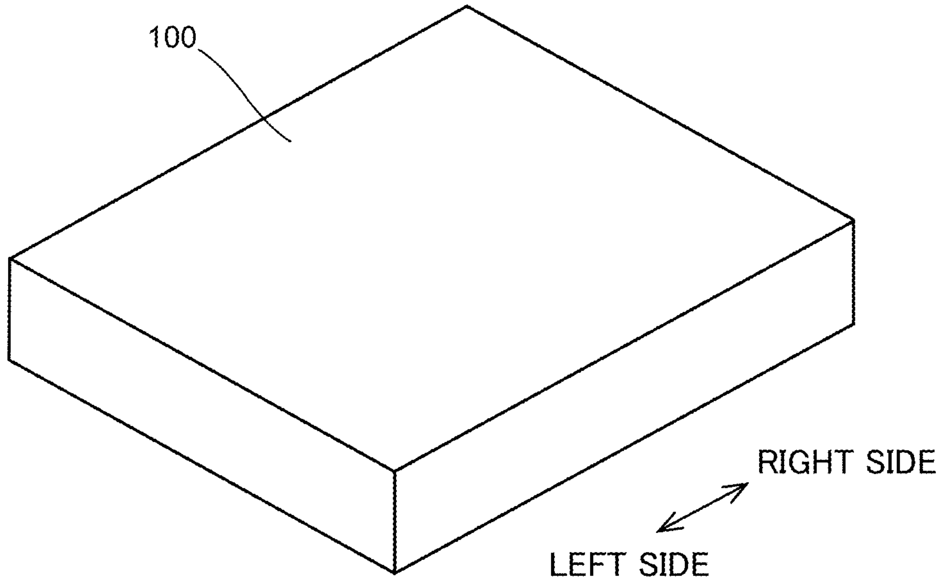
FIG. 1 is a perspective view of a seat cushion 100 according to an embodiment of the invention.

FIG. 1 is a perspective view of a seat cushion 100 according to an embodiment of the invention. The seat cushion 100 has a substantially rectangular parallel piped shape formed of a three-dimensional filaments-linked structure. Although the seat cushion 100 has a rectangular parallel piped shape in this embodiment, the seat cushion 100 may have an irregular shape in which, for example, the thickness is varied in the front-back direction or the surface has unevenness, to the extent that the effect of the invention is not impaired.

Figure 2:
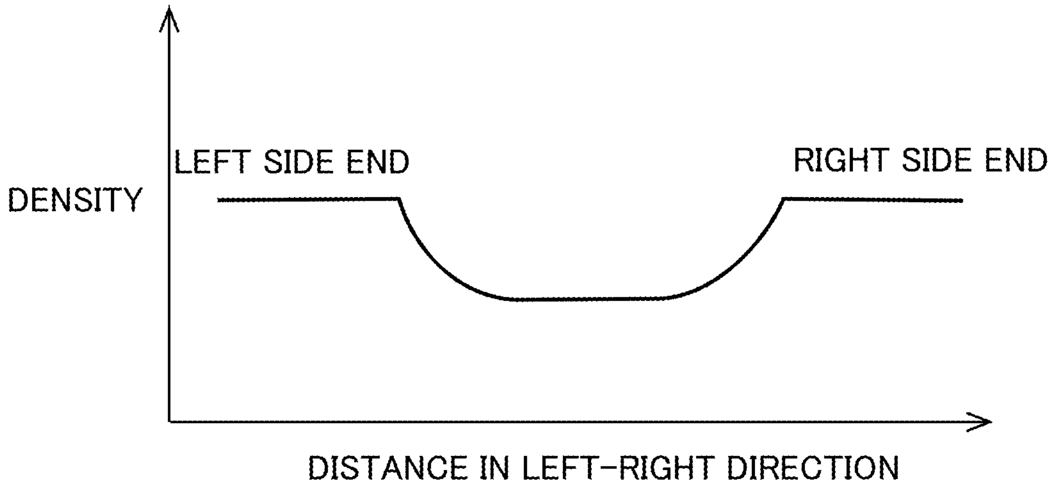
FIG. 2 is a conceptual diagram illustrating an example of a distribution of density of a three-dimensional filaments-linked structure in the left-right direction of the seat cushion 100.

FIG. 2 is a conceptual diagram illustrating an example of a distribution of density of the three-dimensional filaments-linked structure in the left-right direction of the seat cushion 100.

The smaller the distribution of density of the three-dimensional filaments-linked structure, the lower the modulus of elasticity. Even with a large sinking depth, the pressure that buttocks receive from the seat cushion 100 is less likely to be high.

The distribution of density of the seat cushion 100 is adjusted according to the upper body weight and width of steps of a user so that the pressure exerted by the seat cushion 100 is equal between at around the buttock tops and at both end portions of buttocks in the left-right direction.

When the seat cushion of the invention is produced as a ready-made product, a public data can be used as a standard upper body weight and a standard width of buttocks of a group of humans who are to use the seat cushion, or the upper body weights and the widths of buttocks of all the group members or members randomly chosen from the group members are measured and the average value, the highest value, or the like can be adopted as a standard upper body weight and a standard width of buttocks. As the group of humans who are to use the seat cushion, an adult group may generally be assumed, but the human group may be minors, such as an infant group in a kindergarten or nursery, a kid group in an elementary school, or a student group in a junior high school or high school.

Figure 3:
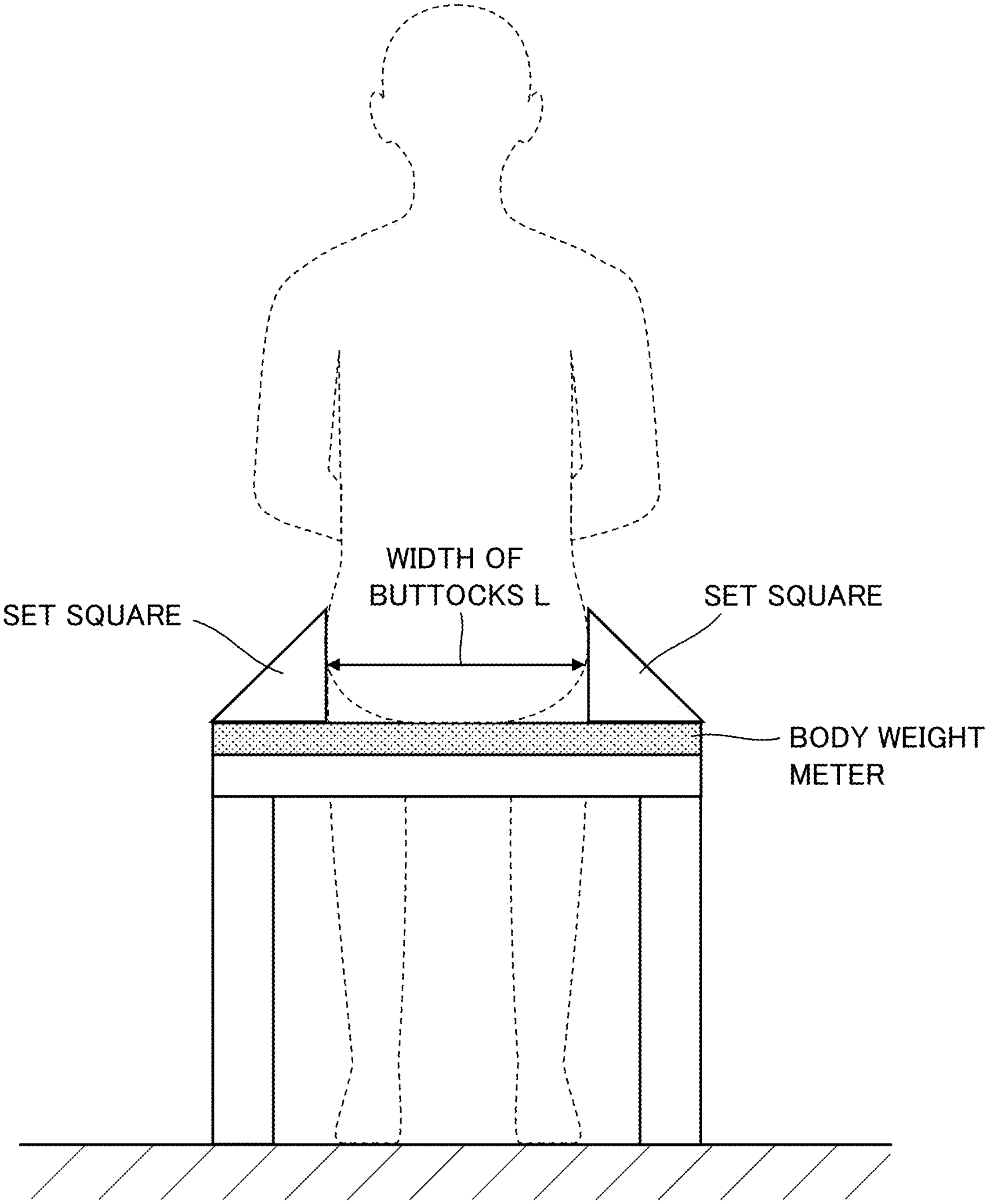
FIG. 3 shows an example of a method for measuring an upper body weight and a width of buttocks of a user.

FIG. 3 shows an example of a method for measuring the upper body weight and the width of buttocks of a user. The upper body weight of a user can be measured with a body weight meter placed on a chair. The width of buttocks can be measured by setting a set square on each of the left and right ends of buttocks to measure the distance between the set squares. A value obtained by subtracting or adding a certain value from or to the above-measured width of buttocks may be adopted as the width of buttocks in view of the part of buttocks to be in contact with the seat cushion 100.

The buttock top portion of an individual user in the invention can be determined, as a simplified manner, based on the width of buttocks obtained in FIG. 3 as follows. Although the distance between the two buttock tops differs from one person to another, the distance is about 10 cm in an adult. Thus, an area between 5 cm left of the center position of the width of buttocks measured in FIG. 3 and 5 cm right of the center position can be taken as the buttock top portion. In order to more accurately determine the buttock top portion, it is preferred that the distance D cm between the buttock tops of an individual user is measured and an area between ½D cm left of the center position of the width of buttocks measured in FIG. 3 and ½D cm right of the center position is taken as the buttock top portion. More accurately, the buttock top portion can be determined by directly measuring the buttock top portion of an individual user, specifically, the distance between the ischial tuberosities of ischiums which are in contact with a chair in sitting on the chair. As the standard buttock top portion of the human group, public data related to the distance between ischial tuberosities may be used, or an average value or the like of distances between ischial tuberosities of ischiums directly measured for all the group members or members randomly chosen from the group members may be used.

Figure 4:
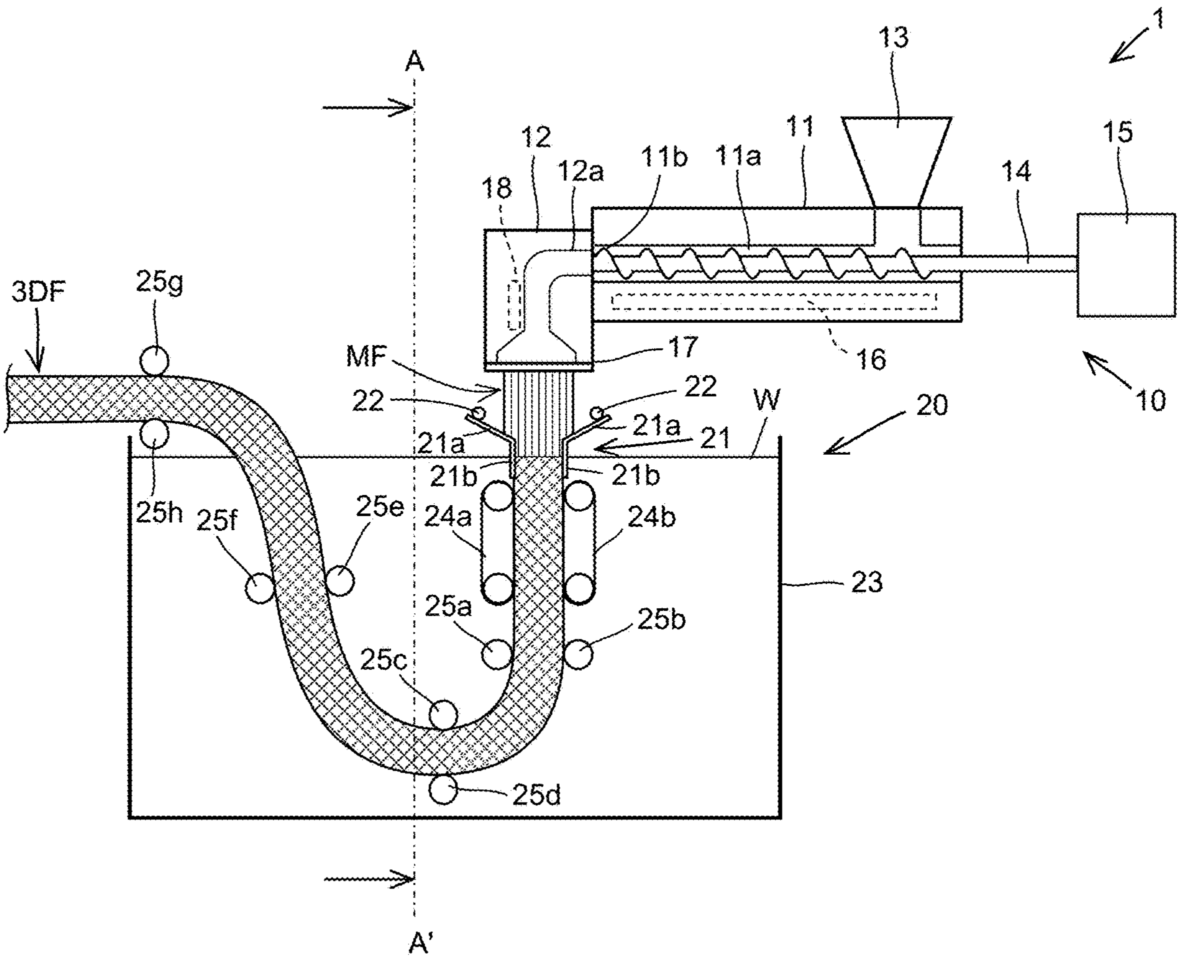
FIG. 4 is a schematic diagram of production equipment 1 of a three-dimensional filaments-linked structure which can be used for producing the seat cushion 100.
Figure 5:
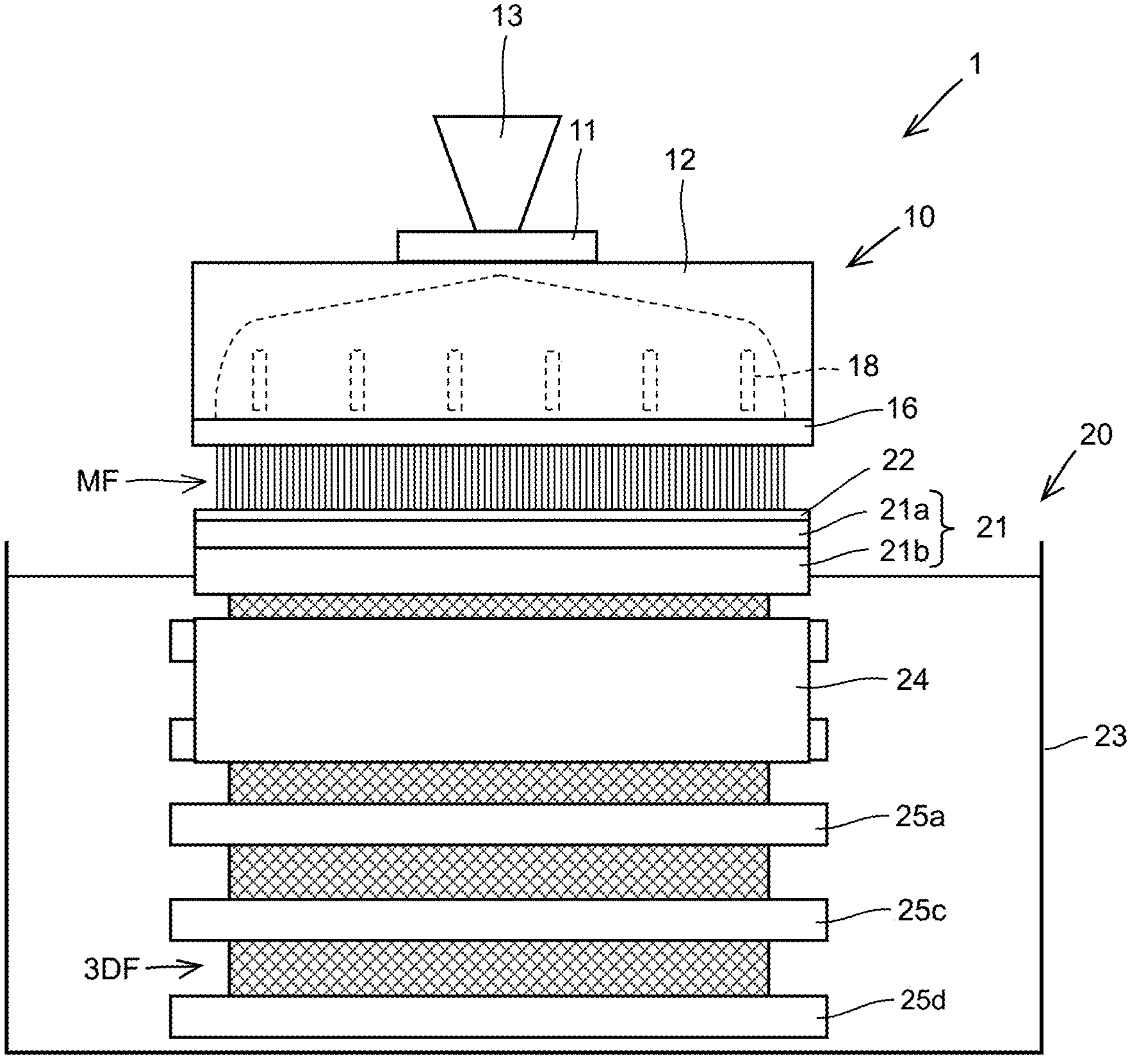
FIG. 5 is an A-A' sectional view of the production equipment 1 shown in FIG. 4.

FIG. 4 is a schematic diagram of production equipment 1 of a three-dimensional filaments-linked structure that can be used for producing the seat cushion 100. FIG. 5 is an A-A' sectional view of the production equipment 1 shown in FIG. 4.

The production equipment 1 of a three-dimensional filaments-linked structure includes a molten filament supplying unit 10 that discharges downward in the vertical direction a molten filament group MF composed of a plurality of molten filaments having a diameter in the range of 0.3 mm to 3 mm, and a fusion-bond forming unit 20 that three-dimensionally entangles the molten filament group MF to fusion-bond contact points, and then cools and solidifies the molten filament group MF to form a three-dimensional filaments-linked structure.

The molten filament supplying step and an apparatus for this step will be described first.

The molten filament supplying unit 10 includes a pressure melting unit 11 (extruder) and a filament discharging unit 12 (die). The pressure melting unit 11 includes a material charging unit 13 (hopper), a screw 14, a screw motor 15 that drives the screw 14, a screw heater 16, and a plurality of temperature sensors which are not shown, and has formed therein a cylinder 11*a* for conveying a thermoplastic resin or a thermoplastic elastomer (hereinafter sometimes collectively referred to as "thermoplastic resin or the like") supplied from the material charging unit 13 while heat-melting the thermoplastic resin or the like by the screw heater 16.

The screw 14 is rotatably housed in the cylinder 11*a*. A cylinder discharging port 11*b* for discharging the thermoplastic resin or the like toward the filament discharging unit 12 is formed at an end on the downstream side of the cylinder 11*a*. The heating temperature of the screw heater 16 is controlled, for example, based on detected signals of the temperature sensors provided in the molten filament supplying unit 10.

The filament discharging unit 12 includes a nozzle unit 17, a die heater 18, and a plurality of temperature sensors which are not shown in the figure, and has formed therein a conduit 12*a* that guides the thermoplastic resin or the like in a molten state discharged from the cylinder discharging port 11*b* to the nozzle unit 17.

The nozzle unit 17 is a metal thick plate of a substantially rectangular parallel piped shape and is provided on a lower portion of the filament discharging unit 12 corresponding to the downmost stream portion of the conduit 12*a*. A plurality of nozzle openings for discharging molten filaments are formed in the nozzle unit 17. As an example, the nozzle openings are arranged zigzag in the front-back and left-right directions, and the distance between adjacent nozzle openings (pitch) is approximately 5 to 15 mm. However, a specific form of the nozzle openings is not particularly limited. The nozzle opening diameter and the nozzle opening density may be varied in the left-right and front-back directions of the nozzle unit.

As the thermoplastic resin or the like that can be used as a material of the three-dimensional filaments-linked structure, for example, a thermoplastic resin, such as a polyolefin resin, for example, polyethylene or polypropylene, a polyester resin, for example, polyethylene terephthalate, a polyamide resin, for example, nylon 66, a polyvinyl chloride resin, or a polystyrene resin, and a thermoplastic elastomer, such as a styrene elastomer, a vinyl chloride elastomer, an olefin elastomer, a urethane elastomer, a polyester elastomer, a nitrile elastomer, a polyamide elastomer, or a fluoroelastomer, can be used.

The thermoplastic resin or the like supplied from the material charging unit 13 is heat-molten in the cylinder 11*a* and is supplied to the conduit 12*a* of the filament discharging unit 12 from the cylinder discharging port 11*b* as the thermoplastic resin or the like in a molten state, for example, in such a manner that the thermoplastic resin or the like is extruded by the screw 14. Subsequently, the molten filament group MF composed of a plurality of molten filaments is discharged so that the molten filaments run downward in parallel from each of the plurality of nozzle openings of the nozzle unit 17.

Next, the three-dimensional filaments fused body forming step, the three-dimensional filaments-linked structure forming step, and apparatuses in the steps will be described.

The fusion-bond forming unit 20 includes a cooling water tank 23, an underwater drawing machine (a pair of slat conveyers) 24, a plurality of conveying rollers 25*a* to 25*h*, and a pair of receiving plates 21 that regulates the thickness of the three-dimensional filaments-linked structure. The receiving plates 21 are each a metal plate having a bent and including a slope 21*a* that has a form of flat plate inclined downward and a vertical surface 21*b* that has a form of flat plate extending downward in the vertical direction from the lower end of the slope 21*a*. The receiving plates 21 reduce the dimension in the front-back direction of the molten filament group MF to the front-back distance between the vertical surfaces 21*b* by guiding the thickness direction ends of the molten filament group MF toward the central part by the front and back slopes 21*a*, and smoothen the surfaces while increasing the density of the thickness direction ends of the molten filament group MF. A cooling water supplying apparatus 22 that supplies cooling water to the receiving plates 21 is provided.

The cooling water tank 23 is a water tank for storing cooling water W. The underwater drawing machine 24 and the plurality of conveying rollers 25*a* to 25*h* are provided inside the cooling water tank 23. The underwater drawing machine 24 and the plurality of conveying rollers 25*a* to 25*h* are driven by a driving motor which is not shown in the figure.

The molten filament group MF (a plurality of filaments of the thermoplastic resin or the like) discharged from the nozzle unit 17 is regulated in the thickness (dimension in the front-back direction) by the receiving plates 21 as described above and bends by the action of buoyancy of the cooling water W in the cooling water tank 23. Thus, each molten filament in the molten filament group MF forms a random loop. The random loops three-dimensionally entangle with adjacent random loops in the molten state to form a three-dimensional filaments-linked structure 3DF in which contact points of the filaments are fusion-bonded in the three-dimensionally entangled state. The three-dimensional filaments-linked structure 3DF is conveyed by the underwater drawing machine 24 and the plurality of conveying rollers 25*a* to 25*h* while being cooled by the cooling water W in the cooling water tank 23, and is finally discharged out of the cooling water tank 23.

Then, the three-dimensional filaments-linked structure density controlling step will be described.

The three-dimensional filaments-linked structure density controlling step is included in the three-dimensional filaments-linked structure forming step, and controls the density of the three-dimensional filaments fused body by varying the drawing speed of the underwater drawing machine.

When the amount of the molten filament group MF discharged from the nozzle unit 17 shown in FIG. 4 and FIG. 5 is constant, the higher the drawing speed of the underwater drawing machine 24, the smaller the density of the three-dimensional filaments-linked structure 3DF (the weight per unit length of the three-dimensional filaments-linked structure 3DF in the front-back direction), and the lower the modulus of elasticity substantially proportionally to the density. On the other hand, the lower the drawing speed of the underwater drawing machine 24, the larger the density of the three-dimensional filaments-linked structure 3DF and the higher the modulus of elasticity substantially proportionally to the density.

Since the density of the three-dimensional filaments-linked structure 3DF can be varied only by varying the drawing speed of the underwater drawing machine 24, the density (i.e., modulus of elasticity) in the left-right direction of the seat cushion can be adjusted in an area of a seat cushion supporting buttocks of a user based on information of the user, and a seat cushion optimal for an individual user can be easily produced. In addition, multiple seat cushions individually adjusted so as to give a distribution of density (i.e., distribution of modulus of elasticity) optimal for each of multiple users can be continuously produced by the same production equipment.

In the three-dimensional filaments-linked structure density controlling step in the invention, the drawing speed of the underwater drawing machine is continuously or intermittently varied, based on a standard upper body weight and a standard width of buttocks of a group of humans who are to use the seat cushion, or based on an upper body weight and a width of buttocks of an individual user, so that the drawing speed in an area for producing the seat surface left-right direction central part corresponding to the standard width of buttocks or the width of buttocks is higher than the drawing speed in areas for producing both seat surface left-right direction end parts outside the standard width of buttocks or the width of buttocks, to thus control the density of the three-dimensional filaments-linked structure in the seat surface left-right direction in the seat cushion.

More preferably, the drawing speed of the underwater drawing machine in areas for producing end portions of the central part adjacent to both end parts of the seat cushion corresponding to positions not to be in contact with the buttocks is increased or decreased so that the drawing speed of the underwater drawing machine in an area for producing the left-right direction central part corresponding to the width of buttocks of the user of the seat cushion is higher than that of the other area and the drawing speed of the underwater drawing machine in areas for producing both the end parts is lower than that of the other area.

Specifically, the underwater drawing machine is controlled in a manner that the drawing speed is continuously or intermittently varied so that the drawing speed is increased from the first end of an area for producing the seat surface left-right direction central part corresponding to the standard width of buttocks or the width of buttocks until the drawing speed reaches a certain drawing speed, and then, is kept constant, and draws a bisymmetric curve toward the final end of the area to reach the initial drawing speed. Then, the curves are preferably controlled so that the drawing speed draws an inverse U-shaped curve.

Further preferably, the drawing speed of the underwater drawing machine is controlled so that the drawing speed of the underwater drawing machine in an area corresponding to the position of the standard buttock top portion of the human group or a buttock top portion of an individual user of the seat surface left-right direction central part is highest.

Most preferably, a mold of the shape of buttocks of an individual user is actually taken and an optimal drawing speed of the underwater drawing machine is determined by using the mold.

In a seat cushion used by multiple users, as a simplified method, the standard upper body weight is assumed to 50 kg, the width of buttocks is to 40 cm, and the distance between the two buttock tops is to 10 cm, and the drawing speed of the underwater drawing machine may be determined so that the sinking ratio (compression ratio) of the seat cushion in the buttock tops is 20% or more and 70% or less.

For further simplification, a spherical object having a weight of 50 kg and a diameter of 80 cm is used as an object corresponding to the standard upper body weight and shape of buttocks, and an optimal drawing speed of the underwater drawing machine may be determined so that a diameter of a circle that forms a contact surface between the spherical object and the seat cushion when the spherical object is placed on the seat cushion, which diameter is a length corresponding to the width of buttocks, is 40 cm. At this time, the position corresponding to the buttock top portion may be set, as a simplified manner, to one position of the center of a circle that is the contact surface between the spherical object and the seat cushion.

Figure 6A:
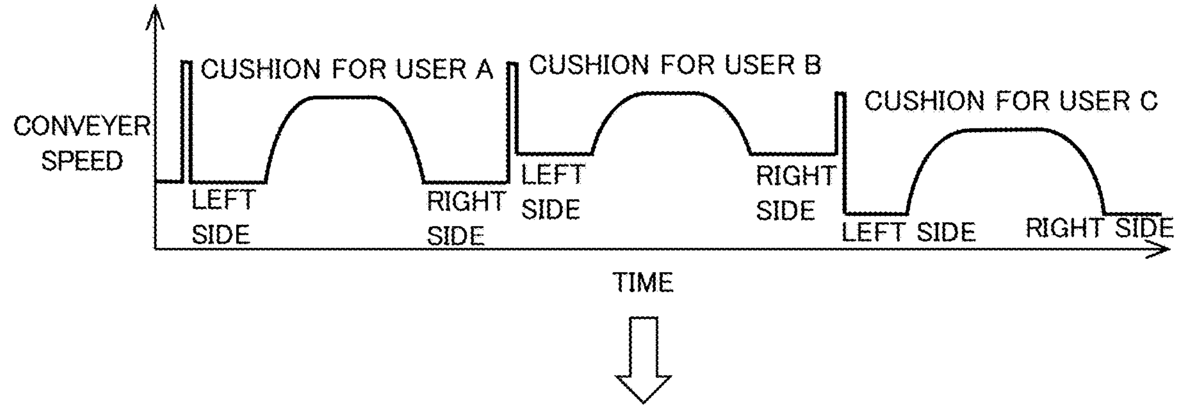
FIG. 6A shows an example of control of the drawing speed of a pair of underwater drawing machines 24 shown in FIG. 4 in a method for producing the seat cushion 100 according to an embodiment of the invention.

FIG. 6A shows an example of control of the drawing speed of a pair of underwater drawing machines 24 shown in FIG. 4 in a method for producing the seat cushion 100 according to an embodiment of the invention.

Note that, in this embodiment, the conveying direction of the three-dimensional filaments-linked structure 3DF conveyed while drawing the three-dimensional filaments-linked structure 3DF with the underwater drawing machine 24 is the left-right direction of the seat cushion 100.

Figure 6B:
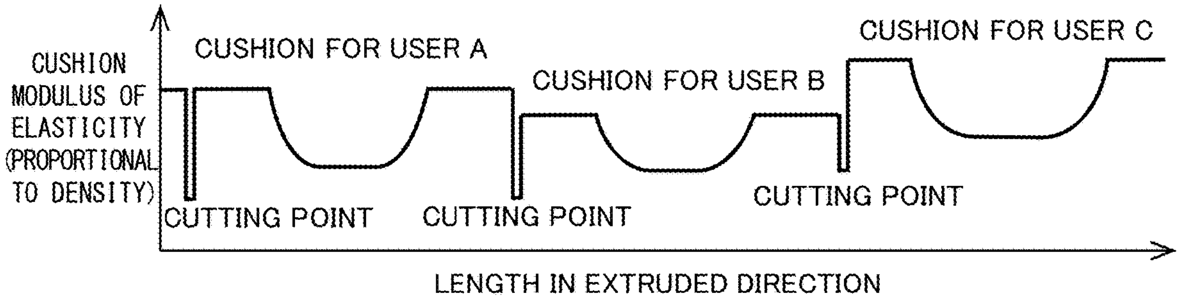
FIG. 6B shows an example of the distribution of modulus of elasticity in the left-right direction of the seat cushion 100 obtained in controlling the drawing speed of the underwater drawing machines 24 as shown in FIG. 6A.

FIG. 6B shows an example of the distribution of modulus of elasticity in the left-right direction of the seat cushion 100 obtained in controlling the drawing speed of the underwater drawing machine 24 as shown in FIG. 6A.

FIG. 6A and FIG. 6B are examples, as an embodiment of the fourth aspect, which show the control of drawing speed and the modulus of elasticity of the cushion in the case where seat cushions having different specifications to be used by individual users A, B, and C are continuously produced by the same production equipment. The case of the users A, B, and C represents such an example in which the users A and B have the same width of buttocks, but the body weight of the user A is higher than that of the user B, and the user C is big and has a large width of buttocks and a high body weight.

Figure 7:
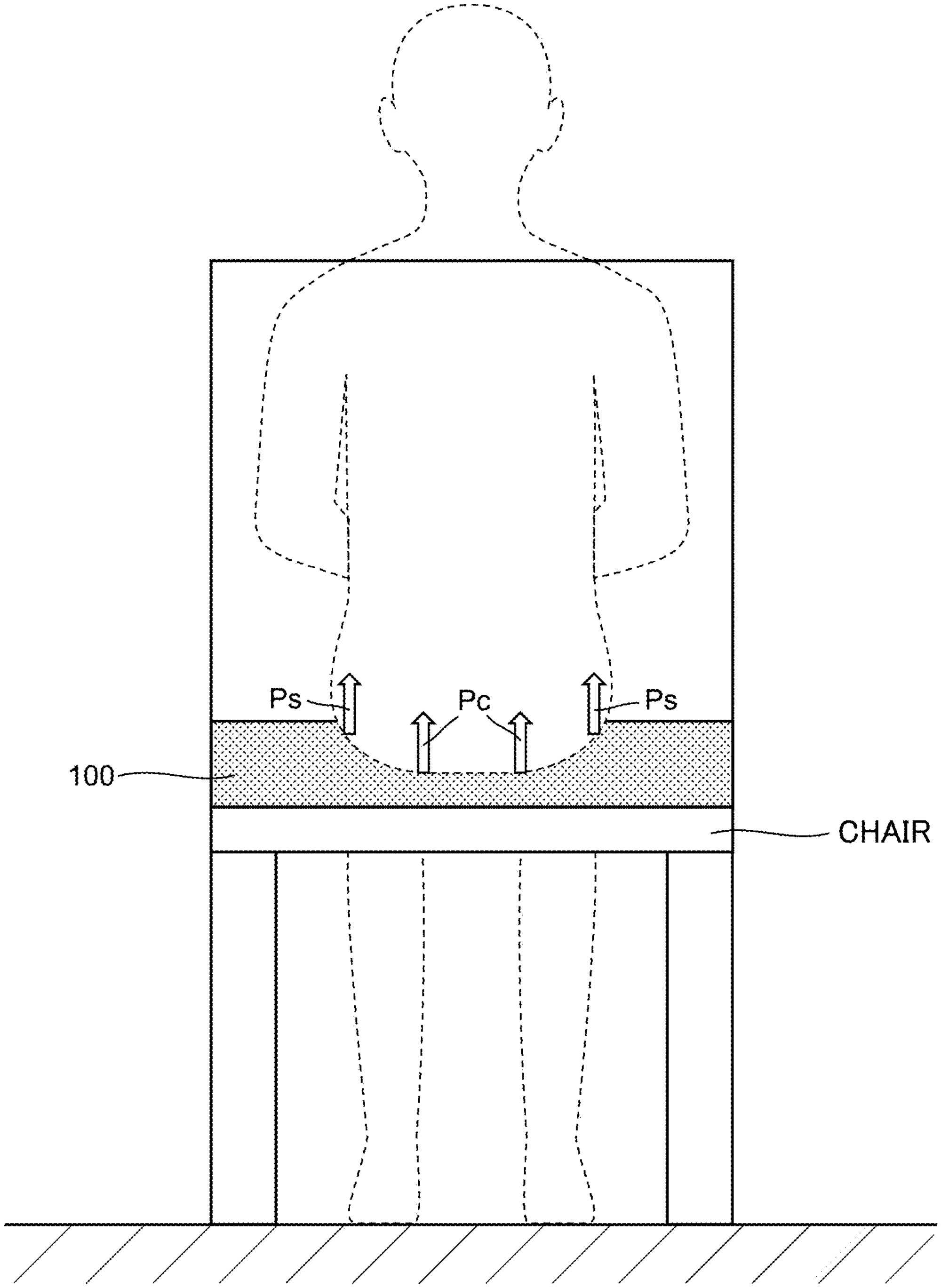
FIG. 7 is an example illustrating a state in supporting user's buttocks with the seat cushion 100 according to an embodiment of the invention.
Figure 8:
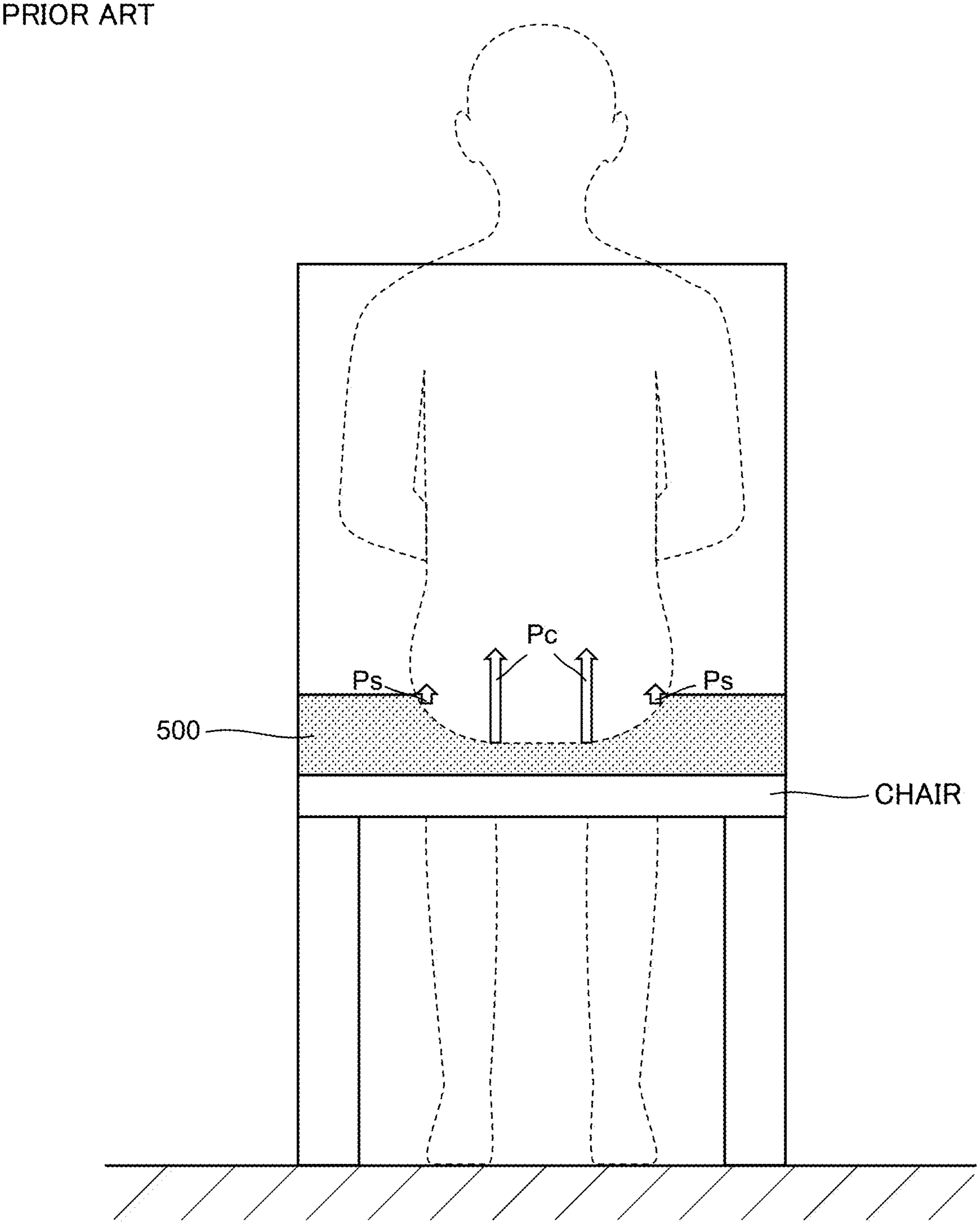
FIG. 8 PRIOR ART
FIG. 8 illustrates a state in supporting user's buttocks with a conventional seat cushion 500 of a uniform material.

FIG. 7 is an example illustrating a state in supporting user's buttocks by using the seat cushion 100 according to an embodiment of the invention. Although the sinking depth is largest at the buttock tops, an excessive increase in the pressure Pc at the buttock tops can be suppressed. On the other hand, although the sinking depth is lower at the left-right direction both end portions of buttocks, a decrease in the pressure Ps at the left-right direction both end portions can be suppressed. By controlling the drawing speed of the underwater drawing machine 24 while taking into account the upper body weight, the width of buttocks, and the buttock top portion of a user, it is possible not only to make the pressure Pc exerted on buttock tops and the pressure Ps exerted on both the left-right direction end portions by the seat cushion 100 equal, but also to make the pressure exerted on buttocks by the seat cushion 100 uniform. In addition, for increasing the stability against left/right swinging, the pressure Ps exerted on the left-right direction both end portions by the seat cushion 100 can be set higher than the pressure Pc exerted on buttock tops by the seat cushion 100.

The invention can be implemented in the following aspects (1) to (5).

(1) A method for producing a seat cushion including a three-dimensional filaments-linked structure of a thermoplastic resin or a thermoplastic elastomer (hereinafter referred to as "thermoplastic resin or the like"), the method including a molten filament supplying step of discharging a plurality of molten filaments of a thermoplastic resin or the like downward in a thermal vertical direction from a plurality of nozzle holes, and a three-dimensional filaments fused body forming step of fusion-bonding contact points between the plurality of molten filaments while three-dimensionally entangling the molten filaments to form a three-dimensional filaments fused body, and a three-dimensional filaments-linked structure forming step of cooling and solidifying the three-dimensional filaments fused body while drawing the three-dimensional filaments fused body with an underwater drawing machine provided in cooling water to thereby form a three-dimensional filaments-linked structure, the three-dimensional filaments-linked structure forming step including a three-dimensional filaments-linked structure density controlling step of controlling a density of the three-dimensional filaments fused body by varying a drawing speed of the underwater drawing machine, the drawing speed of the underwater drawing machine being varied, based on a standard upper body weight and a standard width of buttocks of a group of humans who are to use the seat cushion, so that a drawing speed of the underwater drawing machine in an area for producing a seat surface left-right direction central part corresponding to the standard width of buttocks is higher than a drawing speed of the underwater drawing machine in areas for producing both seat surface left-right direction end parts outside the standard width of buttocks.

(2) The method for producing a seat cushion according to the aspect (1), wherein in the three-dimensional filaments-linked structure density controlling step, a density of the three-dimensional filaments-linked structure in a seat surface left-right direction of the seat cushion is controlled so that a drawing speed of the underwater drawing machine in an area for producing a seat surface left-right direction central part corresponding to the width of buttocks is higher than a drawing speed of the underwater drawing machine in areas for producing both seat surface left-right direction end parts outside the width of buttocks, by continuously or intermittently varying the drawing speed of the underwater drawing machine, based on an upper body weight and a width of buttocks of an individual user.

(3) The method for producing a seat cushion according to the aspect (1) or (2), wherein in the three-dimensional filaments-linked structure density controlling step, a drawing speed of the underwater drawing machine in areas for producing end portions of the seat surface left-right direction central part adjacent to both end parts of the seat cushion corresponding to positions not to be in contact with buttocks is increased or decreased so that the drawing speed of the underwater drawing machine in an area for producing the seat surface left-right direction central part corresponding to the standard width of buttocks or the width of buttocks of the seat cushion is higher than that of other area and the drawing speed of the underwater drawing machine in areas for producing both the end parts is lower than that of other area.

(4) The method for producing a seat cushion according to the aspect (3), wherein in the three-dimensional filaments-linked structure density controlling step, the drawing speed of the underwater drawing machine is controlled so that a drawing speed of the underwater drawing machine in an area corresponding to a position of a standard buttock top portion of the human group or a buttock top portion of an individual user of the seat surface left-right direction central part is highest.

(5) A seat cushion comprising a three-dimensional filaments-linked structure of one material that is a thermoplastic resin or a thermoplastic elastomer, the seat cushion having a flat seat surface and having a density of the three-dimensional filaments-linked structure of a seat surface left-right direction central part corresponding to a standard width of adult buttocks lower than a density thereof in both seat surface left-right direction end parts outside the standard width of adult buttocks.

INDUSTRIAL APPLICABILITY

A seat cushion produced by the production method of the invention can be used as a cushion for a chair, for a sofa, for a seat of a vehicle and airplane, and for a floor cushion.

Embodiments of the invention are described in detail above, but the invention is not limited to the above embodiments, and various variation and modification can be made to the extent that does not depart from the gist of the invention. All or a part of the elements constituting each of the embodiments can be of course appropriately combined to the extent that does not lead to contradiction.

REFERENCE SIGNS LIST

1: Production equipment of three-dimensional filaments-linked structure
10: Molten filament supplying unit
11: Pressure melting unit (extruder)
12: Filament discharging unit (die)
13: Material charging unit (hopper)
14: Screw
15: Screw motor
16: Screw heater

17: Nozzle unit
18: Die heater
20: Fusion-bond forming unit
21: A pair of receiving plates
22: Cooling water supplying apparatus
23: Cooling water tank
24: Underwater drawing machine (a pair of slat conveyers)
25: A plurality of conveying rollers
100: Seat cushion

The invention claimed is:

1. A method for producing a seat cushion comprising a three-dimensional filaments-linked structure of a thermoplastic resin or a thermoplastic elastomer, the method comprising:

a molten filament supplying step of discharging a plurality of molten filaments of a thermoplastic resin or a thermoplastic elastomer downward in a thermal vertical direction from a plurality of nozzle holes, a three-dimensional filaments fused body forming step of fusion-bonding contact points between the plurality of molten filaments while three-dimensionally entangling the molten filaments to form a three-dimensional filaments fused body, and a three-dimensional filaments-linked structure forming step of cooling and solidifying the three-dimensional filaments fused body while drawing the three-dimensional filaments fused body with an underwater drawing machine arranged in cooling water, to thereby form a three-dimensional filaments-linked structure, the three-dimensional filaments-linked structure forming step including a three-dimensional filaments-linked structure density controlling step of controlling a density of the three-dimensional filaments fused body by varying a drawing speed of the underwater drawing machine, the drawing speed of the underwater drawing machine being varied, based on a standard upper body weight and a standard width of buttocks of a group of humans who are to use the seat cushion, and a drawing speed of the underwater drawing machine in an area for producing a seat surface left-right direction central part corresponding to the standard width of buttocks being higher than a drawing speed of the underwater drawing machine in areas for producing both seat surface left-right direction end parts outside the standard width of buttocks.

2. The method according to claim 1, wherein in the three-dimensional filaments-linked structure density controlling step, a density of the three-dimensional filaments-linked structure in a seat surface left-right direction of the seat cushion is controlled so that a drawing speed of the underwater drawing machine in an area for producing a seat surface left-right direction central part corresponding to the width of buttocks is higher than a drawing speed of the underwater drawing machine in areas for producing both seat surface left-right direction end parts outside the width of buttocks, by continuously or intermittently varying the drawing speed of the underwater drawing machine, based on an upper body weight and a width of buttocks of an individual user.

3. The method according to claim 2, wherein in the three-dimensional filaments-linked structure density controlling step, a drawing speed of the underwater drawing machine in an area for producing end portions of the seat surface left-right direction central part adjacent to both end parts of the seat cushion corresponding to positions not to be in contact with buttocks is increased or decreased so that the drawing speed of the underwater drawing machine in an area for producing the seat surface left-right direction central part corresponding to the standard width of buttocks or the width of buttocks of the seat cushion is higher than that of other area and the drawing speed of the underwater drawing machine in areas for producing both the end parts is lower than that of other area.

4. The method according to claim 1, wherein in the three-dimensional filaments-linked structure density controlling step, a drawing speed of the underwater drawing machine in an area for producing end portions of the seat surface left-right direction central part adjacent to both end parts of the seat cushion corresponding to positions not to be in contact with buttocks is increased or decreased so that the drawing speed of the underwater drawing machine in an area for producing the seat surface left-right direction central part corresponding to the standard width of buttocks or the width of buttocks of the seat cushion is higher than that of other area and the drawing speed of the underwater drawing machine in areas for producing both the end parts is lower than that of other area.

5. The method according to claim 4, wherein in the three-dimensional filaments-linked structure density controlling step, the drawing speed of the underwater drawing machine is controlled so that a drawing speed of the underwater drawing machine in an area corresponding to a position of a standard buttock top portion of the human group or a buttock top portion of an individual user of the seat surface left-right direction central part is highest.

* * * * *